UNITED STATES PATENT OFFICE 2,474,237

PREPARATION OF TERTIARY ALKYL SULFENAMIDES

Lawrence T. Eby, Roselle, N. J., assignor to Standard Oil Development Company, a corporation of Delaware No Drawing. Application November 21, 1945, Serial No. 630,141

4 Claims. (Cl. 260—551)

This invention relates to a simple and efficient method of preparing tertiary alkyl sulfenamides.

Heretofore it has been known that when primary alkyl mercaptans are contacted with aqueous haloamine solution, a reaction took place with the formation of a product which contained practically no nitrogen. Sulfenamides having a formula such as

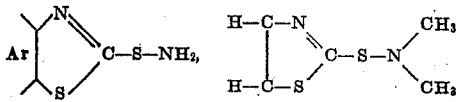

and

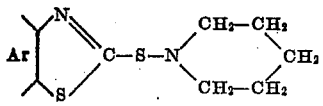

have been prepared by the reaction of chloramine with the corresponding mercaptans, but in all these cases the carbon attached to the mercapto sulfur has attached to it electro negative groups, and it has been found that with primary alkyl mercaptans no sulfenamides were formed, so it was thought that in the presence of tertiary alkyl groups which are less strongly electro negative than primary alkyl groups, the sulfenamide would not be formed.

It has now been discovered that tertiary alkyl mercaptans, when contacted with an aqueous solution of a haloamine, yield a corresponding sulfenamide in good yield.

This invention has for an object the preparation of tertiary alkyl sulfenamides.

Another object of the invention is to prepare tertiary alkyl sulfenamides in good yields by an efficient and economical method.

Another object is a process for the reaction of a tertiary alkyl mercaptan with a haloamine to form a tertiary alkyl sulfenamide.

The tertiary alkyl sulfenamides prepared according to this invention have the general formula

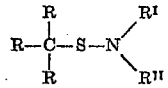

where the R groups may be the same or different and may be alkyl, aryl, aralkyl or alkaryl and may contain various substituents, such as halogen, hydroxyl, amino, nitro, cyano, thiocyanate, cyanate, isocyanate, isothiocyanate, carboxy, carboxy ester, carbonate, sulfate, sulfonate, phosphate, phosphonate, keto, aldehyde, mercapto, sulfide, amide and substituents containing unsaturation, etc., and where $R^I$ and $R^{II}$ may be the same or different and may be hydrogen, alkyl, aryl, aralkyl or alkaryl. $R^I$ and $R^{II}$ may be substituted aliphatic and aromatic groups and any other group which forms a stable compound when attached to a nitrogen which has a halogen atom attached to it.

It is further contemplated in this invention that tertiary alkyl mercaptans are reacted with any compound containing a nitrogen to halogen bond wherein the nitrogen containing compound may be organic or inorganic in nature. The nitrogen-containing compound may also contain more than one halogen attached to the nitrogen and may contain as many as three halogens and thus may react with as many mercapto groups as there are halogens present in the nitrogen-containing compound. The mercaptan may be a polytertiary mercaptan wherein more than one mercapto group is present.

According to the practices taught by the present invention, it is possible to produce high molecular weight polymers which are in the nature of resins where a tertiary alkyl mercaptan containing more than one mercapto group is reacted with haloamines. By reacting tertiary alkyl polymercaptans with haloamines containing more than one halogen on the nitrogen, it is possible to prepare high molecular weight three dimentional polymers.

The products prepared according to this invention have uses as bearing corrosion inhibitors for lube oils and as anti-oxidants for many organic compounds normally susceptible to oxidation such as gasoline, rubber, oils, resins, etc. The products of this invention may also be used in the manufacture of synthetic rubber and in its vulcanization and in the vulcanization of synthetic elastomers. They may be used in insecticidal and fungicidal compositions.

It is contemplated to use the products of this invention as lube oil additives. Certain of the tertiary alkyl sulfenamides have been found to be especially valuable corrosion inhibitors and oxidation inhibitors for lubricating oils. In the following lubricating oil blends the reaction products of diisobutyl mercaptan and chloramine, and of triisobutyl mercaptan and chloramine have been used and their value has been tested. The corresponding diisobutyl mercaptan and triisobutyl mercaptan have been tested in the same way and the results below clearly show that the sulfenamides are superior as corrosion inhibitors to the mercaptans from which they are prepared and represent an advance in the art.

| Additive | 4 Hr. S. O. D. Corr. Test at 325° F.—Total mg. Cu-Pb wt. loss | | | | | | | |
|---|---|---|---|---|---|---|---|---|
| | 4 Hrs. | 8 | 12 | 16 | 20 | 24 | 28 | 32 |
| Base Oil | 0 | 170 | | | | | | |
| 0.5% Diisobutyl Mercaptan | 5 | 8 | 26 | 257 | | | | |
| 1.0% Diisobutyl Mercaptan | 2 | 10 | 21 | 213 | | | | |
| 0.5% Diisobutyl Sulfenamide¹ | 0 | 0 | 4 | 11 | 23 | 34 | 92 | 226 |
| 1.0% Diisobutyl Sulfenamide | 0 | 0 | 5 | 12 | 26 | 35 | 100 | |
| 0.5% Triisobutyl Mercaptan | 0 | 0 | 3 | 253 | | | | |
| 1.0% Triisobutyl Mercaptan | 0 | 0 | 0 | 85 | 352 | | | |
| 0.5% Triisobutyl Sulfenamide² | 0 | 0 | 5 | 17 | 28 | 54 | 198 | |
| 1.0% Triisobutyl Sulfenamide | 0 | 0 | 0 | 11 | 21 | 42 | 64 | 109 |

¹ Reaction product of diisobutyl mercaptan and chloramine.
² Reaction product of triisobutyl mercaptan and chloramine.

It is also part of this invention that other elements of Group V of the Periodic System may be used in place of nitrogen. Valuable arsenic compounds, for example, may be made for use as insecticides, and valuable phosphorous compounds may be made which, when added to lube oils, have application and are useful as antioxidants and bearing corrosion preventatives.

The following examples are set forth only by way of illustration and are not intended to limit the invention in any way.

*Preparation of a chloramine solution*

Sodium hypochlorite was prepared by dissolving 80 g. of sodium hydroxide in 200 cc. of water, cooling, adding 200 g. of cracked ice and passing in chlorine gas until a drop of the solution gave no yellow precipitate with mercuric chloride solution. The temperature was kept below 1° C. during the entire addition of the chlorine. This solution was diluted to 600 cc. and titrated with sodium thiosulfate to determine the amount of sodium hypochlorite present. An amount of this solution equivalent to 575 cc. of 1.5 N NaOCl was added to 550 cc. of 1.5 N NH4OH. The ammonium hydroxide had been previously cooled in an ice bath.

This chloramine solution was made in a 3 liter flask with a stirrer and surrounded by a salt-ice bath. The temperature was kept below 5° C. at all times and this solution was then ready for use in the reaction of tertiary mercaptans and chloramine in the following examples.

*Example I.—Preparation of diisobutyl sulfenamide*

102.2 grams (0.7 mol) of diisobutyl mercaptan was added dropwise to the chloramine solution prepared as above. The temperature during the addition was kept below 5° C. and the addition required one-half hour. The mixture was stirred overnight, during which time the temperature gradually rose to that of the room. The organic layer was separated, washed several times with water and the crude sulfenamide was dried over anhydrous potassium carbonate. The dry product was distilled at reduced pressure and diisobutyl sulfenamide was obtained in good yield.

*Example II.—Preparation of triisobutyl sulfenamide*

141.4 grams (0.7 mol) of triisobutyl mercaptan was added dropwise with stirring over a period of one-half hour and at a temperature within the range of 0° to 5° C. to a chloramine solution prepared as above. The mixture was stirred overnight while the temperature slowly rose to that of the room. The organic layer was removed, washed with water and dried over anhydrous potassium carbonate. The resulting product contained nitrogen in chemical combination and triisobutyl sulfenamide was present in a substantial amount.

*Example III*

Lorol mercaptan was treated with aqueous chloramine solution in a like manner. The lorol mercaptan was recovered with only a negligible amount of nitrogen present which shows that there was a negligible amount of reaction to form the sulfenamide.

What is claimed and sought to be secured by Letters Patent is:

1. A process for making tertiary alkyl sulfenamides which comprises reacting a tertiary alkyl mercaptan with chloramine.
2. A process according to claim 1 in which the mercaptan is diisobutyl mercaptan.
3. A process according to claim 1 in which the mercaptan is triisobutyl mercaptan.
4. A process for the preparation of compounds of the general formula

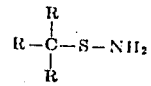

where each R group is an alkyl group, which comprises reacting a tertiary alkyl mercaptan with chloramine.

LAWRENCE T. EBY.

REFERENCES CITED

The following references are of record in the file of this patent:

UNITED STATES PATENTS

| Number | Name | Date |
|---|---|---|
| 2,045,888 | Tschunkur et al. | June 30, 1936 |
| 2,261,024 | Hanslick | Oct. 28, 1941 |
| 2,268,467 | Ashworth | Dec. 30, 1941 |
| 2,404,695 | Coleman | July 23, 1946 |

FOREIGN PATENTS

| Number | Country | Date |
|---|---|---|
| 586,351 | Germany | Oct. 20, 1933 |

OTHER REFERENCES

Rheinboldt et al., "Berichte deutsche Chem. Gesell," vol. 72 (1939), pp. 659, 663, 664, 668.